J. ANGERS.
Rattoon-Cutting Machine.
No. 160,992.    Patented March 23, 1875.
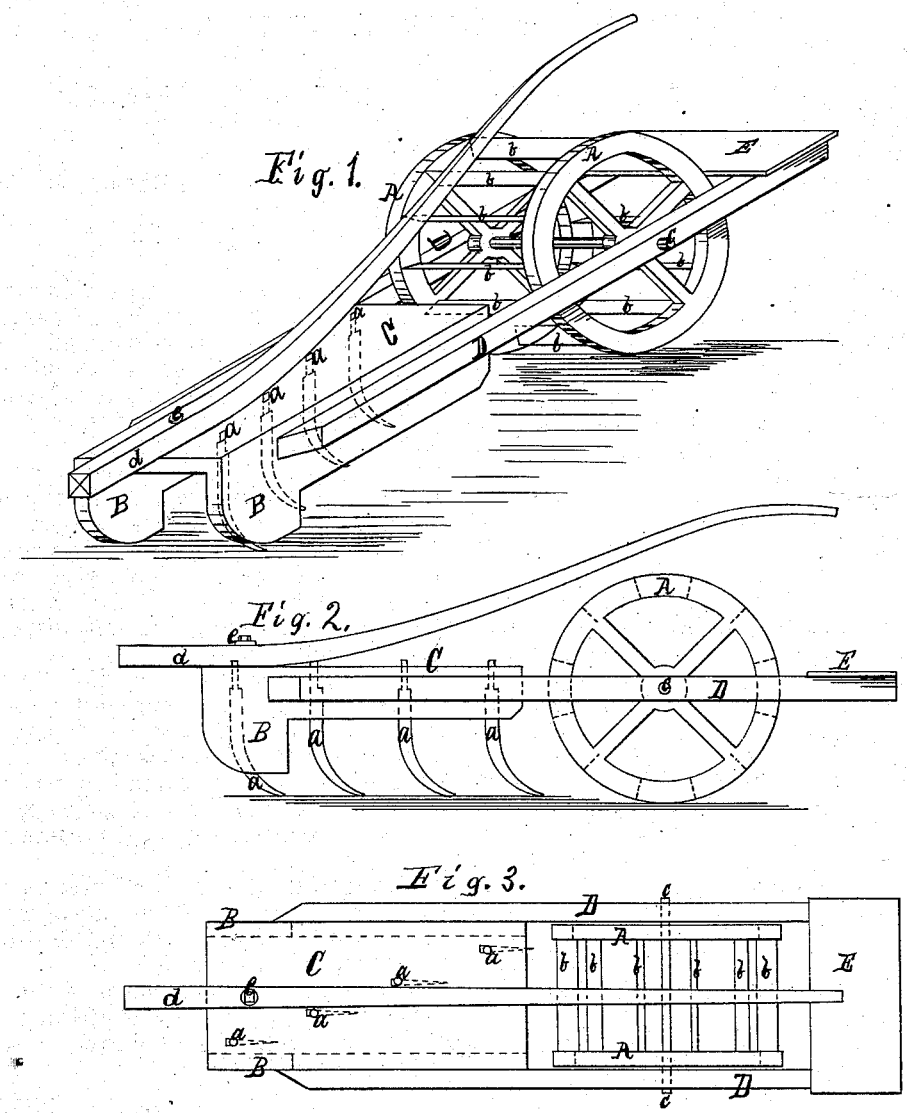
Witnesses.
J. P. Dederick.
W. S. Kerfoot.
Inventor.
John Angers.

UNITED STATES PATENT OFFICE.

JOHN ANGERS, OF DALLAS, TEXAS.

IMPROVEMENT IN RATTOON-CUTTING MACHINES.

Specification forming part of Letters Patent No. 160,992, dated March 23, 1875; application filed December 15, 1874.

*To all whom it may concern:*

Be it known that I, JOHN ANGERS, of the city of Dallas, State of Texas, have invented a Rattoon-Cutting Machine, of which the following is a specification:

The object of my invention is to rapidly pull up and cut into short lengths the stubbles and roots of sugar-cane (styled "rattoon") which are left upon the ground after the crop has been gathered. This I accomplish by the combination, in a rattoon-cutting machine, of a revolving cutter-wheel, A, and curved vertical cutters $a$, with a substantial frame for supporting the same, as clearly shown in the perspective view, Figure 1, of the accompanying drawing.

The invention is illustrated more in detail in the side elevation, Fig. 2, and in the plan view, Fig. 3.

The front part of the machine rests upon runners B B, across the tops of which is secured a solid plank, C, through which pass the four vertical cutters $a$, at equal distances apart in a diagonal line. These cutters are nearly sickle-shape, gradually curving downward and backward, and ground very sharp upon their forward edges, and should be set to cut to a depth of six or eight inches. To the runners B B are secured the side bars D D, in which are bearings for the cutter-wheel A. The cutters $b$ of this wheel should be of steel, ground sharp upon their edges, and firmly secured in any convenient manner between the rims of two heavy cast-iron wheels, A A. Through the centers of these wheels passes a shaft, $c$, upon which they turn. The cutters $b$ in this wheel, as it is drawn along over the stubbles, cut all the roots that lie parallel with the ridge, and the cutters $a$ cut all those that lie in an opposite direction. Secured to the back ends of the bars D D is a platform, E, upon which the driver stands, thus placing additional weight upon the cutters $b$. $d$ is a beam, secured to the plank C by a bolt, $e$. To the front end of this beam the team is hitched, and it extends back and over the cutter-wheel, gradually tapering to a handle within easy reach of the driver. By forcing this handle or lever to the right or left, the driver can guide the machine, to a limited extent, without turning the team.

The machine is drawn by from four to six horses, and as it runs along on the top of the ridge upon which the cane was planted, the curved cutters $a$, and those ($b$) in the cutter-wheel A, will slice the earth in opposite directions, and the result will be the cutting of all roots that would in any way interfere with the plowing.

Having thus described all that is deemed necessary to a full understanding of my invention, what I claim as new, and desire to secure by Letters Patent, is—

The herein-described machine for cutting rattoon roots, provided with vertical cutters $a$, and cutter-wheel A with cutters $b$, substantially as described.

JOHN ANGERS.

Witnesses:
 Z. P. DEDERICK,
 W. S. KERFOOT.